(12) United States Patent
Kwon et al.

(10) Patent No.: US 7,787,064 B2
(45) Date of Patent: Aug. 31, 2010

(54) AUTOMATIC HOLOGRAPHIC DISPLAY DEVICE HAVING CHOLESTERIC LIQUID CRYSTAL PANEL WITH BARRIER AND SLIT REGIONS AND FIRST AND SECOND PHASE DIFFERENCE PLATES ABOVE AND BELOW THE PANEL

(75) Inventors: Ohjeong Kwon, Seoul (KR); Dohyeon Baek, Seoul (KR)

(73) Assignee: Boe Hydis Technology Co., Ltd., Gyeonggi-Do (KR)

( * ) Notice: Subject to any disclaimer, the term of this patent is extended or adjusted under 35 U.S.C. 154(b) by 204 days.

(21) Appl. No.: 12/191,619

(22) Filed: Aug. 14, 2008

(65) Prior Publication Data

US 2009/0251625 A1 Oct. 8, 2009

(30) Foreign Application Priority Data

Apr. 8, 2008 (KR) ...................... 10-2008-0032508

(51) Int. Cl.
*G02F 1/1335* (2006.01)
(52) U.S. Cl. .......................................... 349/15; 348/51
(58) Field of Classification Search .................. 349/15; 348/42–60
See application file for complete search history.

(56) References Cited

U.S. PATENT DOCUMENTS 7,518,664 B2 * 4/2009 Mather et al. ................. 349/15
7,532,272 B2 * 5/2009 Woodgate et al. ............. 349/95
2006/0164578 A1 * 7/2006 Matsumoto et al. ......... 349/117

* cited by examiner

*Primary Examiner*—John Heyman
(74) *Attorney, Agent, or Firm*—Ladas and Parry LLP

(57) ABSTRACT

Provided is an automatic holographic display device including: a first liquid crystal panel, a second liquid crystal panel disposed below the first liquid crystal panel, and a backlight that is disposed below the second liquid crystal panel and emits light, wherein the second liquid crystal panel comprises a cholesteric liquid crystal panel in which a barrier region and a slit region are alternately arranged according to an applied electric field, a first phase difference plate disposed above the cholesteric liquid crystal panel, and a second phase difference plate disposed below the cholesteric liquid crystal panel, wherein the backlight comprises a reflection plate that reflects light. The automatic holographic display device includes a modulated cholesteric liquid crystal panel and a phase difference plate, and thus mutual conversion between 2D flat images and 3D holographic images can be easy, the process of manufacturing the device can be simplified, and the manufacturing costs can be decreased. In addition, an automatic holographic display device in which optical transmittance can be improved by the modulated cholesteric liquid crystal panel and the phase difference plates, and luminance reduction that commonly occurs using a parallax barrier method can be prevented is provided.

9 Claims, 6 Drawing Sheets

AUTOMATIC HOLOGRAPHIC DISPLAY DEVICE HAVING CHOLESTERIC LIQUID CRYSTAL PANEL WITH BARRIER AND SLIT REGIONS AND FIRST AND SECOND PHASE DIFFERENCE PLATES ABOVE AND BELOW THE PANEL

CROSS-REFERENCE TO RELATED PATENT APPLICATION

This application claims the benefit of Korean Patent Application No. 10-2008-0032508, filed on Apr. 8, 2008, in the Korean Intellectual Property Office, the disclosure of which is incorporated herein in its entirety by reference.

BACKGROUND OF THE INVENTION

1. Field of the Invention

The present invention relates to an automatic holographic display device, and more particularly, to an automatic holographic display device that can display 3-dimensional holographic images using a parallax barrier method by using a modulated cholesteric liquid crystal panel and a phase difference plate, wherein liquid crystal in the modulated cholesteric liquid crystal panel is directly driven by an electrode, thereby electrically enabling mutual conversion between two-dimensional flat images and three-dimensional holographic images, and improving transmittance of three-dimensional holographic images when displayed.

2. Description of the Related Art

In general, 3-dimensional holographic images can be displayed by separating left eye images and right eye images to have binocular disparity.

Therefore, users generally wear specific spectacles having different polarization components for the left and right eyes, and thus can view holographic images displayed in image display devices. However, users have to wear separate specific spectacles in order to view holographic images.

To overcome such inconvenience, image display devices in which left eye images and right eye images are directly separated, and thus users can view holographic images without wearing specific spectacles have been recently developed. In addition, automatic holographic display devices in which an intermediate via a switching element that separates left eye images and right eye images is formed, if desired, and thus 2D flat images can be viewed as is most often the case, and can be converted to 3D holographic images, if necessary have been developed.

In general, automatic holographic display devices display 3D holographic images by using a parallax barrier. A parallax barrier allows a display device to show three-dimensional images such that vertical or horizontal slits are formed in front of images corresponding to the left and right eyes, and holographic images synthesized through the slits are separated and observed.

Herein, automatic holographic display devices can be classified into front barrier type devices and rear barrier type devices depending on whether the parallax barrier is positioned in front of or behind an image panel that displays images.

FIG. 1 is a cross-sectional view of a conventional holographic display device. Referring to FIG. 1, the conventional holographic display device includes an image panel 200 and polarizers 100. The image panel 200 includes a color filter 220, an image liquid crystal layer 230 and a conventional thin film transistor (not shown) between an upper substrate 210 and a lower substrate 240, and displays images by an operation of the thin film transistor. The polarizers 100 are respectively disposed above and below the image panel 200.

A barrier panel 300 in which slits are formed through a parallax barrier 310 is disposed below the polarizer 100 disposed below the image panel 200, and another polarizer 100 is disposed below the barrier panel 300.

Reference numeral 330 denotes transparent plates that are respectively formed above and below the parallax barrier 310.

Herein, an aperture ratio of the barrier panel 300 directly affects transmittance when 3-dimensional images are viewed. In general, to display natural 3D images, the parallax barrier 310 should account for a large portion of the barrier panel.

In a liquid crystal display device using the barrier panel 300, the parallax barrier 310 is designed to have an aperture ratio of 40% or less. For example, if a 2D flat image has a luminance of 500 cd (candela) per unit area when viewed, a 3D holographic image has a maximum luminance of m 200 cd (candela) per unit area when viewed. Thus, the optical efficiency is largely decreased.

To address these problems, Korean Patent Application No. 10-2002-0085356 discloses a holographic display device. In this holographic display device, cholesteric liquid crystal layers are disposed to be separated from each other, and a liquid crystal panel is separately disposed between the cholesteric liquid crystal layers. A switching operation of the liquid crystal panel can enable mutual conversion between 2D flat images and 3D holographic images. In addition, a phase difference plate and a polarizer are disposed above the upper cholesteric liquid crystal layer.

However, the holographic display device disclosed in the aforementioned application has problems such that the liquid crystal panel has to be separately designed for mutual conversion between 2D flat images and 3D holographic images, multiple layers are adhered in the manufacturing process, thereby complicating the manufacturing process, optical transmittance is decreased, and luminance is reduced.

SUMMARY OF THE INVENTION

The present invention provides an automatic holographic display device in which manufacturing processes can be simplified and manufacturing costs can be reduced by including a modulated cholesteric liquid crystal panel and a phase difference plate.

The present invention also provides an automatic holographic display device in which optical transmittance can be improved by including a modulated cholesteric liquid crystal panel and a phase difference plate, and luminance reduction that frequently occurs using a parallax barrier method can be prevented.

According to an aspect of the present invention, there is provided an automatic holographic display device comprising: a first liquid crystal panel, a second liquid crystal panel disposed below the first liquid crystal panel, and a backlight that is disposed below the second liquid crystal panel and emits light, wherein the second liquid crystal panel comprises a cholesteric liquid crystal panel in which a barrier region and a slit region are alternately arranged according to an applied electric field, a first phase difference plate disposed above the cholesteric liquid crystal panel, and a second phase difference plate disposed below the cholesteric liquid crystal panel, wherein the backlight comprises a reflection plate that reflects light.

The first liquid crystal panel may comprise a liquid crystal panel that displays images, a first polarizer disposed above the liquid crystal panel, and a second polarizer disposed below the liquid crystal panel.

The cholesteric liquid crystal panel may comprise an upper plate, a lower plate, a first electrode formed on a back surface of the upper plate, a second electrode formed on a front surface of the lower plate to face the first electrode, and a cholesteric liquid crystal layer disposed between the upper plate and the lower plate.

At least one of the first electrode and the second electrode may comprise a barrier electrode corresponding to the barrier region and a slit electrode corresponding to the slit region, wherein the barrier electrode and the slit electrode are alternately arranged while being separated from each other.

The first phase difference plate and the second phase difference plate each may have a phase retardation value of $\lambda/4$.

A slow axis of at least one of the first phase difference plate and the second phase difference plate may be formed in the direction of any one of an angle of +45° and an angle of −45°.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an automatic holographic display device according to exemplary embodiments of the present invention will be described more fully with reference to the accompanying drawings.

Figure 1:
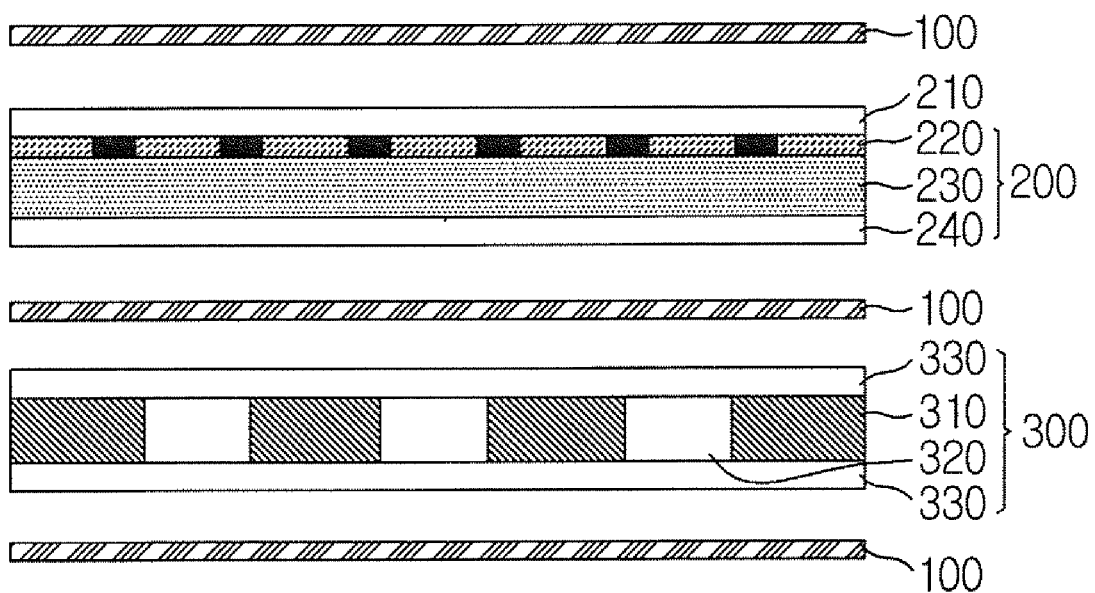
FIG. 1 is a cross-sectional view of a conventional holographic display device.
Figure 2:
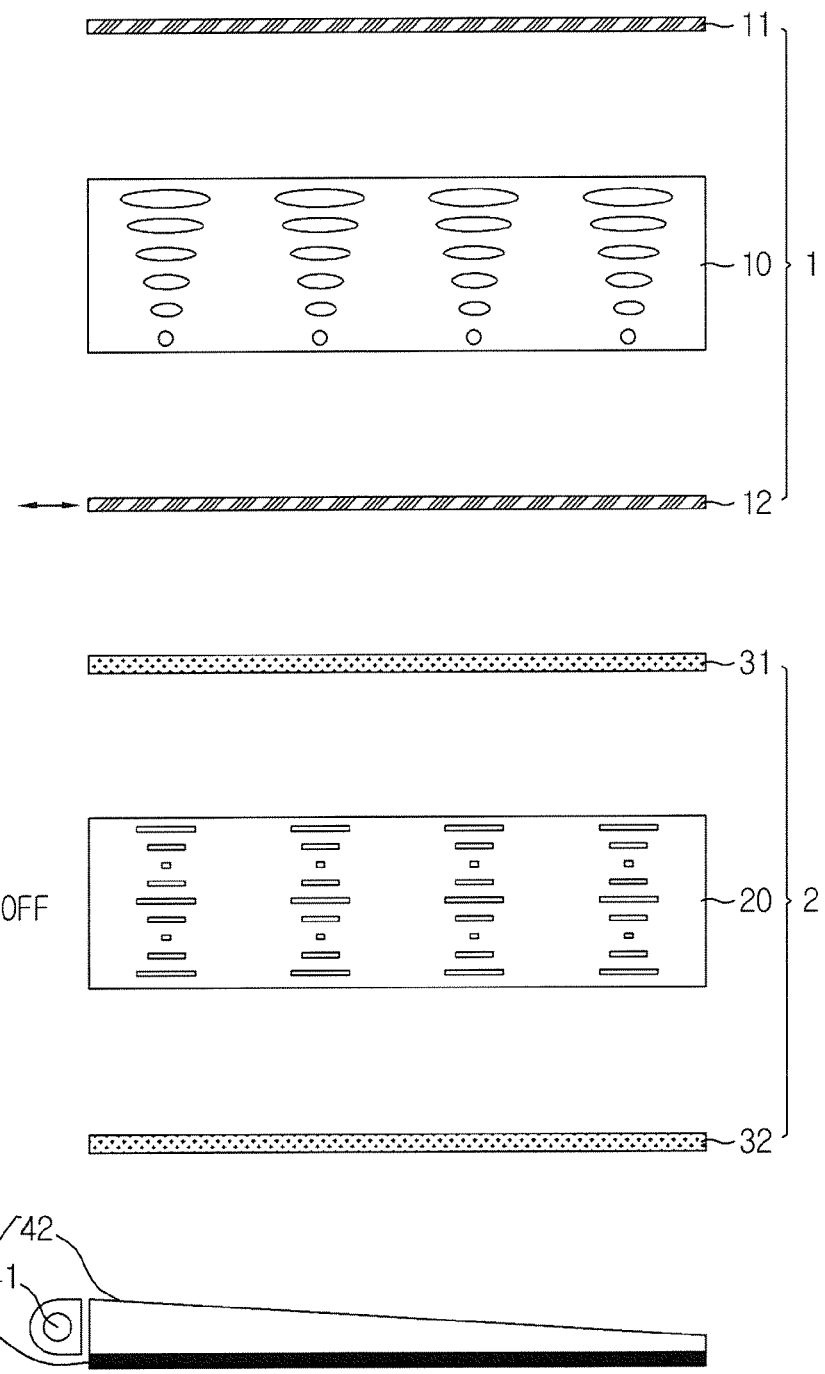
FIG. 2 is a cross-sectional view of an automatic holographic display device according to an embodiment of the present invention.
Figure 3:
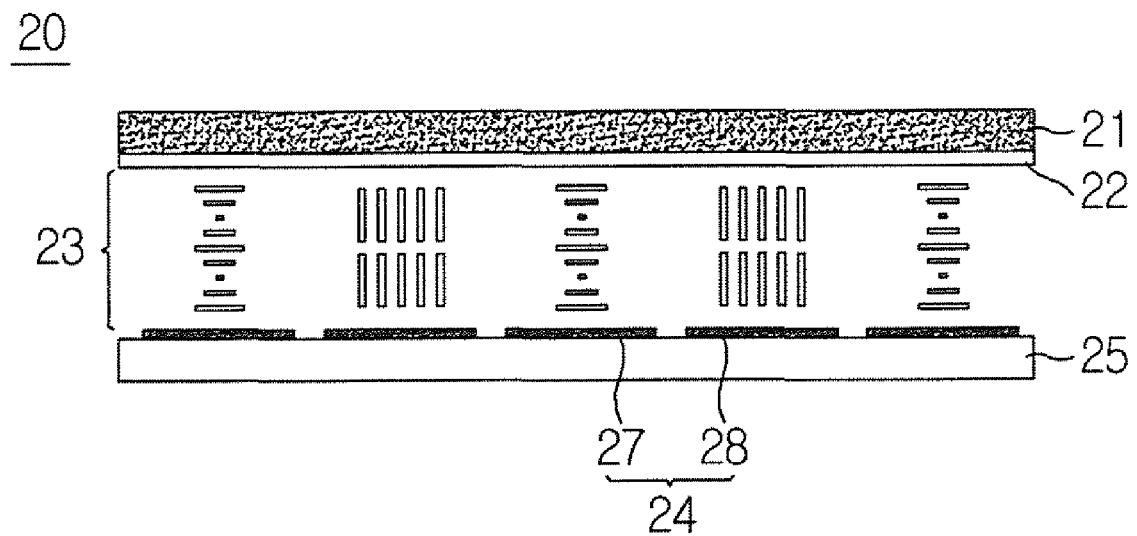
FIG. 3 is a cross-sectional view of a cholesteric liquid crystal panel of the automatic holographic display device of FIG. 2, according to an embodiment of the present invention.
Figure 4:
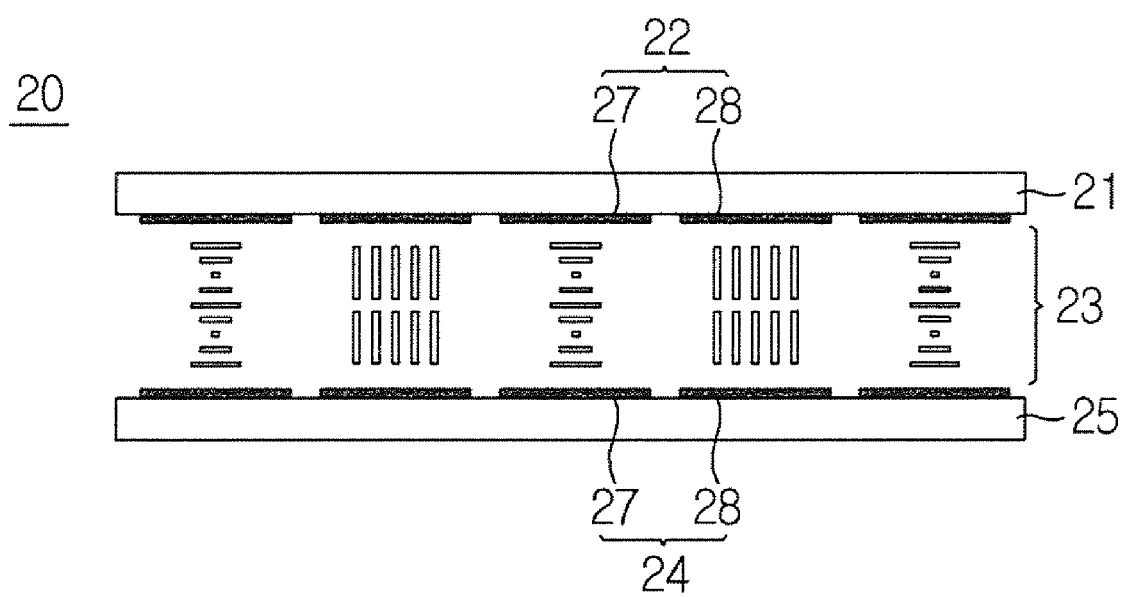
FIG. 4 is a cross-sectional view of a cholesteric liquid crystal panel of the automatic holographic display device of FIG. 2, according to another embodiment of the present invention.

FIG. 2 is a cross-sectional view of an automatic holographic display device according to an embodiment of the present invention. FIG. 3 is a cross-sectional view of a cholesteric liquid crystal panel of the automatic holographic display device of FIG. 2, according to an embodiment of the present invention. FIG. 4 is a cross-sectional view of a cholesteric liquid crystal panel of the automatic holographic display device of FIG. 2, according to another embodiment of the present invention.

Referring to FIGS. 2 through 4, the automatic holographic display device according to the current embodiment of the present invention includes a first liquid crystal panel 1, a second liquid crystal panel 2, and a backlight 4.

The first liquid crystal panel 1 displays 2-dimensional flat images or 3-dimensional holographic images, and includes a liquid crystal panel 10, a first polarizer 11, and a second polarizer 12.

The liquid crystal panel 10 generally includes an upper substrate including a color filter, a lower substrate that is separated from the upper substrate and includes a thin film transistor, and a liquid crystal layer injected between the upper and lower substrates.

The first polarizer 11 is disposed above the liquid crystal panel 10. The second polarizer 12 is disposed below the liquid crystal panel 10 to polarize light incident on the first liquid crystal panel 1.

The second liquid crystal panel 2 can be electrically converted to separate an image for the left eye and an image for the right eye, and includes a cholesteric liquid crystal panel 20, a first phase difference plate 31, and a second phase difference plate 32. The second liquid crystal panel 2 is disposed below the first liquid crystal panel 1.

The cholesteric liquid crystal panel 20 can be switched to convert an image to a 2D flat image or a 3D holographic image, and is driven using a parallax barrier method. The cholesteric liquid crystal panel 20 has a structure in which a barrier region D (refer to FIG. 5) and a slit region B (refer to FIG. 5) are alternately arranged according to an electric field applied when a 3D holographic image is displayed.

In the current embodiment of the present invention, cholesteric liquid crystal is used for preventing luminance reduction which may occur when the 3D holographic image is displayed using the parallax barrier method.

Generally, cholesteric liquid crystals have a selective reflection characteristic in which a helical direction of a spiral liquid crystal structure and a direction of circularly polarized light are consistent with each other, and only circularly polarized light of which wavelength is the same as the spiral pitch of the liquid crystal is reflected (hereinafter, referred to as "Bragg reflection"). Cholesteric liquid crystals may have a right-handed structure or a left-handed structure according to a torsional direction (spiral winding direction). In the current embodiment, by using a cholesteric liquid crystal having a right-handed structure, right circularly polarized light is transmitted, and left circularly polarized light is reflected.

Referring to FIG. 3, the cholesteric liquid crystal panel 20 includes an upper plate 21, a first electrode 22, a cholesteric liquid crystal layer 23, a second electrode 24, and a lower plate 25.

The upper plate 21, which is transparent, is disposed above the cholesteric liquid crystal layer 23, and the lower plate 25, which is transparent, is disposed below the upper plate 21 and the cholesteric liquid crystal layer 23.

The cholesteric liquid crystal layer 23 is formed of the cholesteric liquid crystal described above.

The first electrode 22 is disposed on a back surface of the upper plate 21 to form an electrical field for driving the cholesteric liquid crystal layer 23, and is formed as a transparent electrode plate.

The second electrode 24 is disposed on a front surface of the lower plate 25 to face the first electrode 22, forms an electrical field for driving the cholesteric liquid crystal layer 23, and includes a barrier electrode 27 and a slit electrode 28.

The barrier electrode 27 and the slit electrode 28 are alternately arranged in the second electrode while being separated from each other. In addition, when electric sources are respectively applied to the barrier electrode 27 and the slit electrode 28, a parallax barrier in which the barrier region D (refer to FIG. 5) and the slit region B (refer to FIG. 5) are alternately arranged is formed according to the presence of the applied electric sources.

Alternatively, the first electrode 22 may include the barrier electrode 27 and the slit electrode 28, and the second electrode 24 may be formed as a transparent electrode plate. Alternatively, as illustrated in FIG. 4, both the first electrode 22 and the second electrode 24 may include the barrier electrode 27 and the slit electrode 28 to correspond to each other, wherein the barrier electrode 27 and the slit electrode 28 are alternately arranged. As illustrated in FIG. 4, the configuration in which both the first electrode 22 and the second electrode 24 include the barrier electrode 27 and the slit electrode 28 that are alternately arranged can clearly define the barrier region D (refer to FIG. 5) and the slit region B (refer to FIG. 5) according to the applied electric field. Thus, the cholesteric liquid crystal layer 23 can easily be driven.

That is, at least one of the first electrode 22 and the second electrode 24 includes the barrier electrode 27 and the slit electrode 28, and the barrier electrode 27 and the slit electrode 28 are alternately arranged while being separated from each other.

The first phase difference plate 31 is disposed above the cholesteric liquid crystal panel 20, and is disposed between the second polarizer 12 and the cholesteric liquid crystal panel 20. In addition, the first phase difference plate 31 converts circularly polarized light of incident light to linearly polarized light.

The second phase difference plate 32 is disposed below the cholesteric liquid crystal panel 20, and is disposed between the cholesteric liquid crystal panel 20 and the backlight 4. In addition, the second phase difference plate 32 converts circularly polarized light reflected from the cholesteric liquid crystal panel 20 to linearly polarized light, or converts linearly polarized light reflected from the backlight 4 to circularly polarized light.

Herein, the first and second phase difference plates 31 and 32 have a phase retardation value of $\lambda/4$, and thus facilitate conversion between the linearly polarized light and the circularly polarized light.

In the current embodiment, a slow axis of the first phase difference plate 31 is formed in the direction of an angle of $-45°$, and a slow axis of the second phase difference plate 32 is formed in the direction of an angle of $+45°$.

However, the present invention is not limited thereto, and the slow axis of at least one of the first and second phase difference plates 31 and 32 may be formed in the direction of at least one of the angles $+45°$ and $-45°$ according to the operation of the cholesteric liquid crystal panel 20 described above and a transmission axis of the second polarizer 12.

The backlight 4 emits light to supply uniform light to the first liquid crystal panel 1 and the second liquid crystal panel 2, and includes a light source 41, a light guide plate 42, and a reflection plate 43. The backlight 4 is disposed below the second liquid crystal panel 2.

In the current embodiment, the light source 41 is an edge type light source. However, the present invention is not limited thereto, and a direct type light source can be used. The light guide plate 42 uniformly transmits light emitted from the light source 41 to the first liquid crystal panel 1 and the second liquid crystal panel 2. The reflection plate 43 reflects light emitted from the light source 41 or light reflected from the cholesteric liquid crystal panel 20.

Hereinafter, an operation of the automatic holographic display device according to the current embodiment of the present invention will be described.

Figure 5:
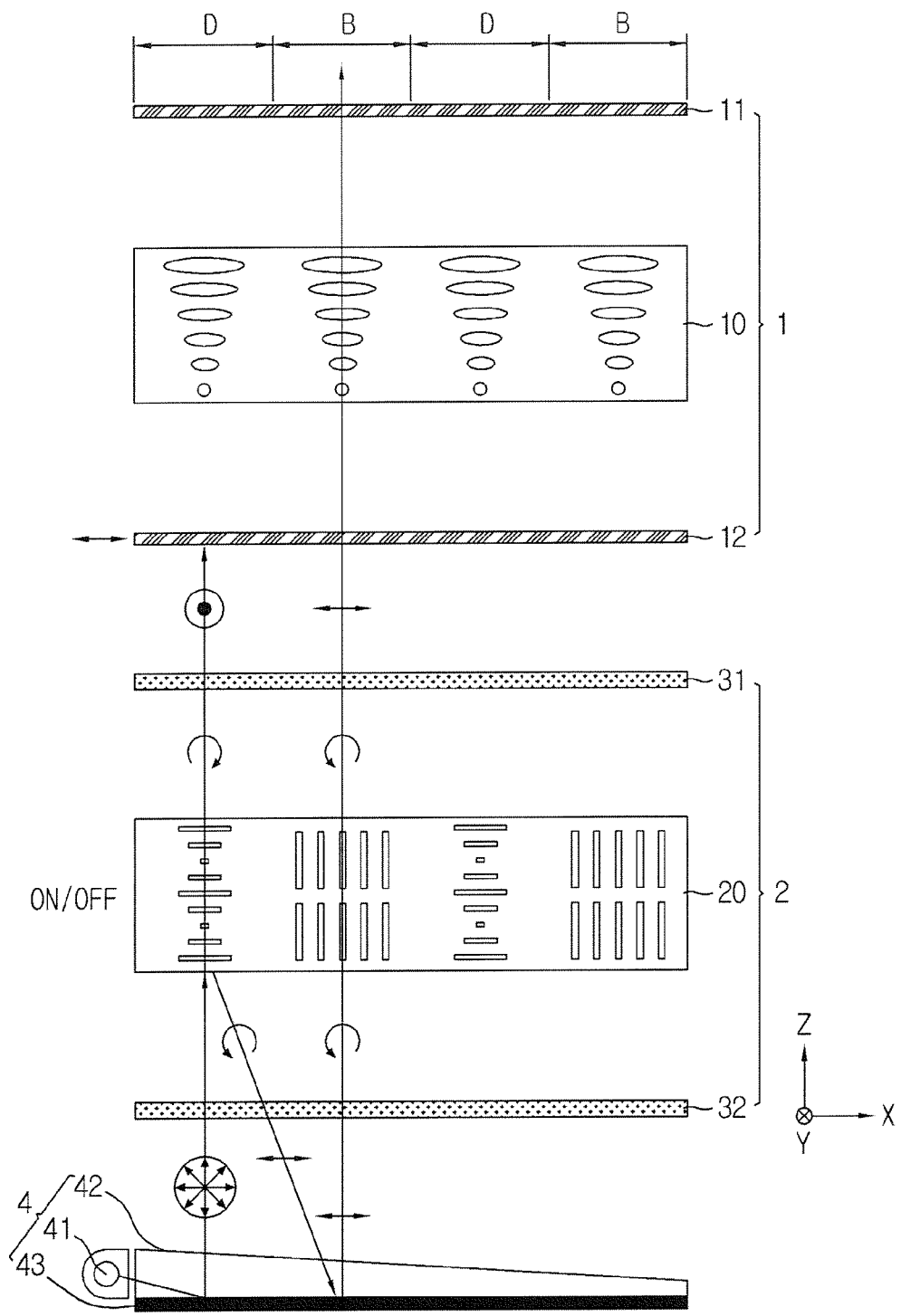
FIGS. 5 and 6 are cross-sectional views showing operational states of the automatic holographic display device of FIG. 2.
Figure 6:
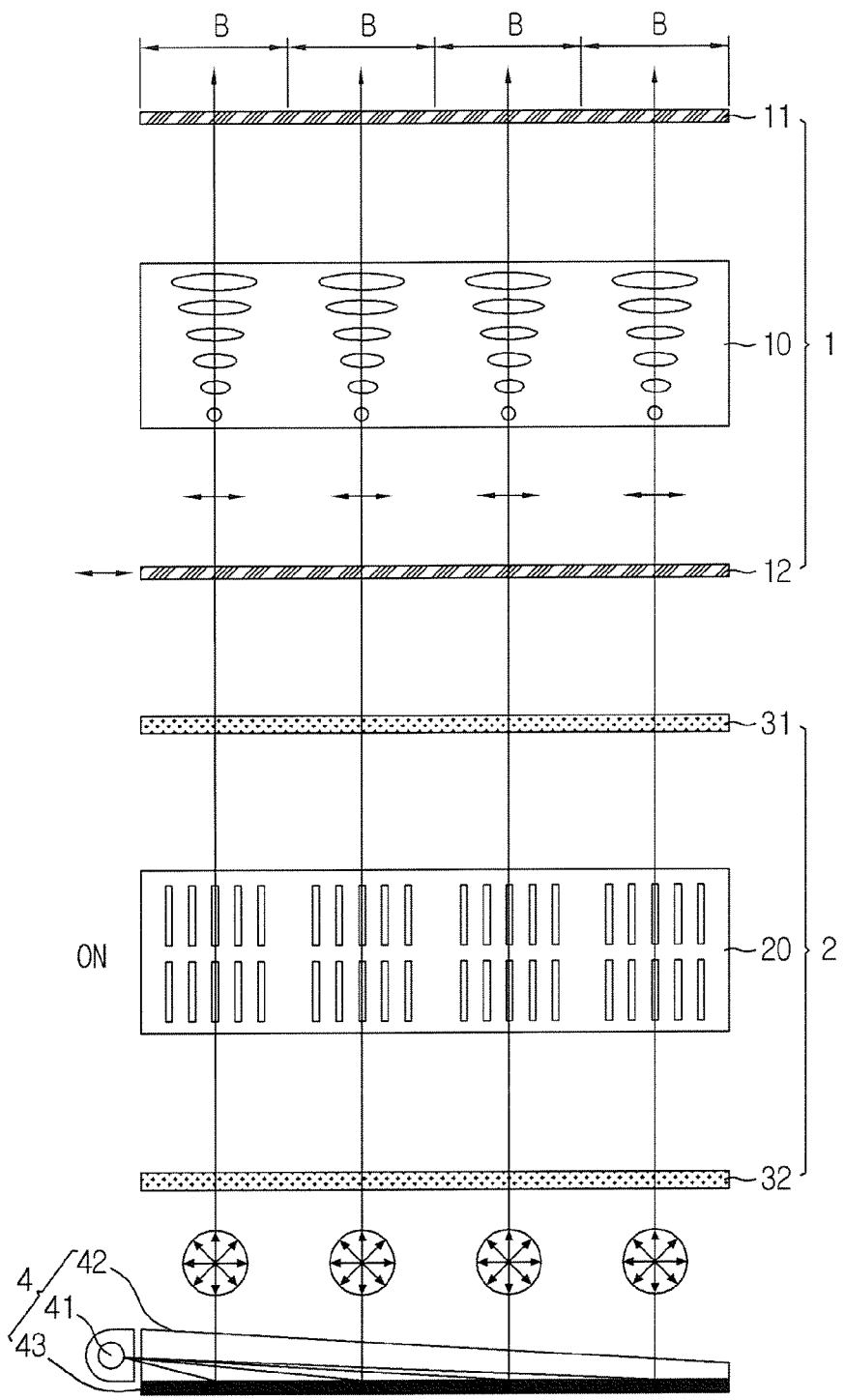

FIGS. 5 and 6 are cross-sectional views showing operational states of the automatic holographic display device of FIG. 2. FIG. 5 illustrates an operation of the automatic holographic display device when a 3D holographic image is displayed, and FIG. 6 illustrates an operation of the automatic holographic display device when a 2D flat image is displayed.

In the automatic holographic display device according to the current embodiment, the transmission axis of the second polarizer 12 is formed as a horizontal transmission axis to be parallel with a width direction X of the automatic holographic display device. In addition, the slow axis of the first phase difference plate 31 is formed in the direction of an angle of $-45°$, thus having a phase retardation value of $\lambda/4$, and the slow axis of the second phase difference plate 32 is formed in the direction of an angle of $+45°$, thus having a phase retardation value of $\lambda/4$.

In addition, the cholesteric liquid crystal panel 20 is the same as illustrated in FIG. 3, and includes cholesteric liquid crystal having a right-handed structure.

Referring to FIG. 5, when an electric source is applied to the first electrode 22 and the slit electrode 28 of the second electrode 24 in the cholesteric liquid crystal panel 20, the cholesteric liquid crystal layer 23 disposed above the barrier electrode 27 is not driven, thus having a spiral structure, and the cholesteric liquid crystal layer 23 disposed above the slit electrode 28 is driven, thus being uniformly arranged in a height direction Z.

Herein, while light emitted from the backlight 4 is transmitted through the cholesteric liquid crystal layer 23 above the barrier electrode 27, only right circularly polarized light is transmitted, and left circularly polarized light is reflected towards the reflection plate 43 of the backlight 4. While transmitting through the first phase difference plate 31, the right circularly polarized light that is transmitted through the cholesteric liquid crystal layer 23 above the barrier electrode 27 is vertically linear polarized parallel to a depth direction Y of the automatic holographic display device, and the vertically linearly polarized light cannot be transmitted through the second polarizer 12. Thus, a region formed above the barrier electrode 27 is the barrier region D through which light emitted from the backlight 4 cannot be transmitted.

In addition, while transmitting through the second phase difference plate 32, the left circularly polarized light reflected towards the reflection plate 43 is horizontally linear polarized parallel to a width direction X of the automatic holographic display device, and the horizontally linearly polarized light is reflected by the reflection plate 43. The reflected horizontally linearly polarized light is left circular polarized while transmitting through the second phase difference plate 32 again, and the left circularly polarized light is directly transmitted through the cholesteric liquid crystal layer 23 above the slit electrode 28.

The left circularly polarized light transmitted through the cholesteric liquid crystal layer 23 is horizontally linear polarized while transmitting through the first phase difference plate 31. The horizontally linearly polarized light is finally transmitted through the second polarizer 12 to be transmitted through the first liquid crystal panel 1, and as a result, is emitted to the outside. Therefore, a region formed above the slit electrode 28 is the slit region B through which light of the backlight 4 is transmitted.

The barrier region D and the slit region B formed as described above are alternately arranged as in the case of the barrier electrode 27 and the slit electrode 28 to be in a parallax barrier form. In addition, although not illustrated, even when an electric source is applied to only the barrier electrode 27 and is not applied to the slit electrode 28, the parallax barrier structure in which the barrier region D and the slit region B are alternately arranged as described above is formed.

That is, by converting the transmission axis of the second polarizer 12, by applying an electric source to any one of the barrier electrode 27 and the slit electrode 28, and by converting the slow axis of at least one of the first and second phase difference plates 31 and 32, the automatic holographic display device of the present invention can display 3D holographic images using a parallax barrier method.

Referring to FIG. 6, to display 2D flat images, when an electric source is applied to both the first electrode 22 and the second electrode 24 in the cholesteric liquid crystal panel 20, all portions of the cholesteric liquid crystal layer 23 are driven.

Herein, light emitted from the backlight 4 passes through the second phase difference plate 32, the cholesteric liquid crystal layer 23, and the first phase difference plate 31. Then, the light is horizontally linearly polarized while finally transmitting through the second polarizer 12 to be transmitted through the first liquid crystal panel 1, and as a result, is emitted to the outside. Accordingly, 2D flat images can be displayed in the first liquid crystal panel 1 that is conventionally driven.

In the present invention, the cholesteric liquid crystal panel is modulated so that cholesteric liquid crystal thereof is directly driven by an electrode. Thus, a barrier region and a slit region are formed.

In addition, by facilitating mutual conversion between circular polarization and linear polarization by using each phase difference plate, mutual conversion between 2D flat images and 3D holographic images is easy. In addition, when 3D holographic images are displayed using a parallax barrier method, the transmittance can be improved.

According to the present invention, an automatic holographic display device includes a modulated cholesteric liquid crystal panel and a phase difference plate, and thus mutual conversion between 2D flat images and 3D holographic images can be easy, the process of manufacturing the device can be simplified, and the manufacturing costs can be decreased.

In addition, an automatic holographic display device in which optical transmittance can be improved by the modulated cholesteric liquid crystal panel and the phase difference plates, and luminance reduction that commonly occurs using a parallax barrier method can be prevented is provided.

In addition, reflected light can be reused according to characteristics of cholesteric liquid crystal, and thus an automatic holographic display device with improved luminance can be obtained.

In addition, cholesteric liquid crystal is driven according to an electric field to define a barrier region and a slit region, and thus a parallax barrier type automatic holographic display device can be obtained.

In addition, an automatic holographic display device in which polarization of light can easily be adjusted by a phase difference plate is provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An automatic holographic display device comprising: a first liquid crystal panel, a second liquid crystal panel disposed below the first liquid crystal panel, and a backlight that is disposed below the second liquid crystal panel and emits light,
    wherein the second liquid crystal panel comprises a cholesteric liquid crystal panel in which a barrier region and a slit region are alternately arranged according to an applied electric field, a first phase difference plate disposed above the cholesteric liquid crystal panel, and a second phase difference plate disposed below the cholesteric liquid crystal panel,
    wherein the backlight comprises a reflection plate that reflects light.

2. The automatic holographic display device of claim 1, wherein the first liquid crystal panel comprises a liquid crystal panel that displays images, a first polarizer disposed above the liquid crystal panel, and a second polarizer disposed below the liquid crystal panel.

3. The automatic holographic display device of claim 1, wherein the cholesteric liquid crystal panel comprises an upper plate, a lower plate, a first electrode formed on a back surface of the upper plate, a second electrode formed on a front surface of the lower plate to face the first electrode, and a cholesteric liquid crystal layer disposed between the upper plate and the lower plate.

4. The automatic holographic display device of claim 3, wherein at least one of the first electrode and the second electrode comprises a barrier electrode corresponding to the barrier region and a slit electrode corresponding to the slit region, wherein the barrier electrode and the slit electrode are alternately arranged while being separated from each other.

5. The automatic holographic display device of claim 1, wherein the first phase difference plate and the second phase difference plate each have a phase retardation value of $\lambda/4$.

6. The automatic holographic display device of claim 5, wherein a slow axis of at least one of the first phase difference plate and the second phase difference plate is formed in the direction of any one of an angle of +45° and an angle of −45°.

7. The automatic holographic display device of claim 2, wherein the first phase difference plate and the second phase difference plate each have a phase retardation value of $\lambda/4$.

8. The automatic holographic display device of claim 3, wherein the first phase difference plate and the second phase difference plate each have a phase retardation value of $\lambda/4$.

9. The automatic holographic display device of claim 4, wherein the first phase difference plate and the second phase difference plate each have a phase retardation value of $\lambda/4$.

* * * * *